(12) United States Patent
Chou

(10) Patent No.: US 6,530,281 B2
(45) Date of Patent: Mar. 11, 2003

(54) MECHANICAL PRESSURE GAUGE HAVING DIGITAL OUTPUT

(76) Inventor: Jason Chou, No. 354, Sec. 2, Yon Pin Road, Taiping City, Taichung Hsien (TW), 411

( * ) Notice: Subject to any disclaimer, the term of this patent is extended or adjusted under 35 U.S.C. 154(b) by 0 days.

(21) Appl. No.: 09/812,836

(22) Filed: Mar. 21, 2001

(65) Prior Publication Data

US 2002/0134165 A1 Sep. 26, 2002

(51) Int. Cl.[7] .................................................. G01L 9/00
(52) U.S. Cl. .......................................... 73/733; 73/705
(58) Field of Search .......................... 73/733, 705, 714, 73/199; 250/231.11

(56) References Cited

U.S. PATENT DOCUMENTS 4,571,995 A * 2/1986 Timme ........................ 73/199
5,138,155 A * 8/1992 Gray ....................... 250/231.19
5,311,014 A * 5/1994 Liucci ..................... 250/231.11

* cited by examiner

Primary Examiner—Max Noori
Assistant Examiner—Alandra Ellington
(74) Attorney, Agent, or Firm—Charles E. Baxley

(57) ABSTRACT

A pressure gauge includes a Bourdon tube coupled to a pinion of a spindle with a link and a sector gear, and to rotate the spindle in correspondence with a pressure in the Bourdon tube. The rotational movement of the spindle or the deformation of the Bourdon tube may be converted into a digital output and shown in a displayer. A disc is secured to the spindle and has a number of openings formed in the peripheral portion. A photo detecting device may be used for detecting a light emitted through the openings of the disc and for detecting the rotational movement of the disc.

1 Claim, 4 Drawing Sheets

US 6,530,281 B2

MECHANICAL PRESSURE GAUGE HAVING DIGITAL OUTPUT

BACKGROUND OF THE INVENTION

1. Field of the Invention

The present invention relates to a pressure gauge, and more particularly to a mechanical pressure gauge having a digital output displayed by a digital diaplayer.

2. Description of the Prior Art

As shown in FIG. 1, a typical mechanical pressure gauge is illustrated and comprises a Bourdon tube 11 coupled to a pressurized fluid reservoir with a port 19 of a housing or a support 10, a pinion 14 and a pointer 16 rotatably supported on support 10 with a spindle 17, and a sector gear 13 rotatably secured on the support 10 and coupled to the Bourdon tube 11 with a link 12 and engaged with the pinion 14. The sector gear 13 may rotate the pinion 14 and thus the pointer 16 to indicate the pressure value when the sector gear 13 is rotated by the Bourdon tube 11 via the link 12 and when the Bourdon tube 11 is deformed by the pressurized fluid that flows into the Bourdon tube 11. A spring 15 is engaged on the spindle 17 and engaged with the support 10 for recovering the spindle 17 after the pressure is released from the support 10. However, the pointer 16 may be used to display or to point an analog output only and may not be used to exactly tell the value of the pressure.

As shown in FIG. 2, illustrated is a typical electric pressure gauge including a pressure sensor 21 engaged in a tube 20 and coupled to an electric circuit 23 for sensing or detecting the pressure in the tube 20. One or more batteries 22 are received in a housing 27 and coupled to the electric circuit 23 for energizing the electric circuit 23 and/or the pressure sensor 21. The electric circuit 23 may convert the pressure in the tube 20 into a digital output which may be displayed in the displayer 24. However, the pressure sensor 21 is rather expensive, and the pressure sensor 21 includes a highly precision configuration that may not be easily manufactured.

The present invention has arisen to mitigate and/or obviate the afore-described disadvantages of the conventional pressure gauges.

SUMMARY OF THE INVENTION

The primary objective of the present invention is to provide a pressure gauge including a mechanical configuration and including a digital output for precisely showing and displaying the value of the pressure.

In accordance with one aspect of the invention, there is provided a pressure gauge comprising a housing, a Bourdon tube coupled to a pressure reservoir for receiving a pressurized fluid, a spindle supported on the housing, a link device for coupling the Bourdon tube to the spindle and to rotate the spindle in correspondence with a pressure in the Bourdon tube, a displayer, and a device for converting a rotational movement of the spindle to a digital output and to be displayed in the displayer. The rotational movement of the spindle and the deformation or the movement of the Bourdon tube may thus be converted into the digital output and may be precisely shown in the displayer.

The link device includes a pinion secured on the spindle and rotated in concert with the spindle, a sector gear rotatably secured in the housing and engaged with the pinion, and a link coupled between the Bourdon tube and the sector gear for rotating the pinion via the sector gear.

A spring-biasing device is further provided for recovering the spindle when the pressure in the Bourdon tube is released.

The rotational movement converting device includes a disc secured to the spindle and rotated in concert with the spindle, the disc includes a peripheral portion having a plurality of openings formed therein, and a photo detecting device for detecting a rotational movement of the disc.

The photo detecting device includes a gap formed therein for receiving the peripheral portion of the disc, a light emitting device disposed on a first side of the disc, and a detector disposed on a second side of the disc for detecting a light generated by the light emitting device and transmitted through the openings of the disc.

The rotational movement converting device further includes an electric circuit coupled between the displayer and the photo detecting device for receiving a detected signal from the photo detecting device.

One or more batteries may further be provided for energizing the electric circuit.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
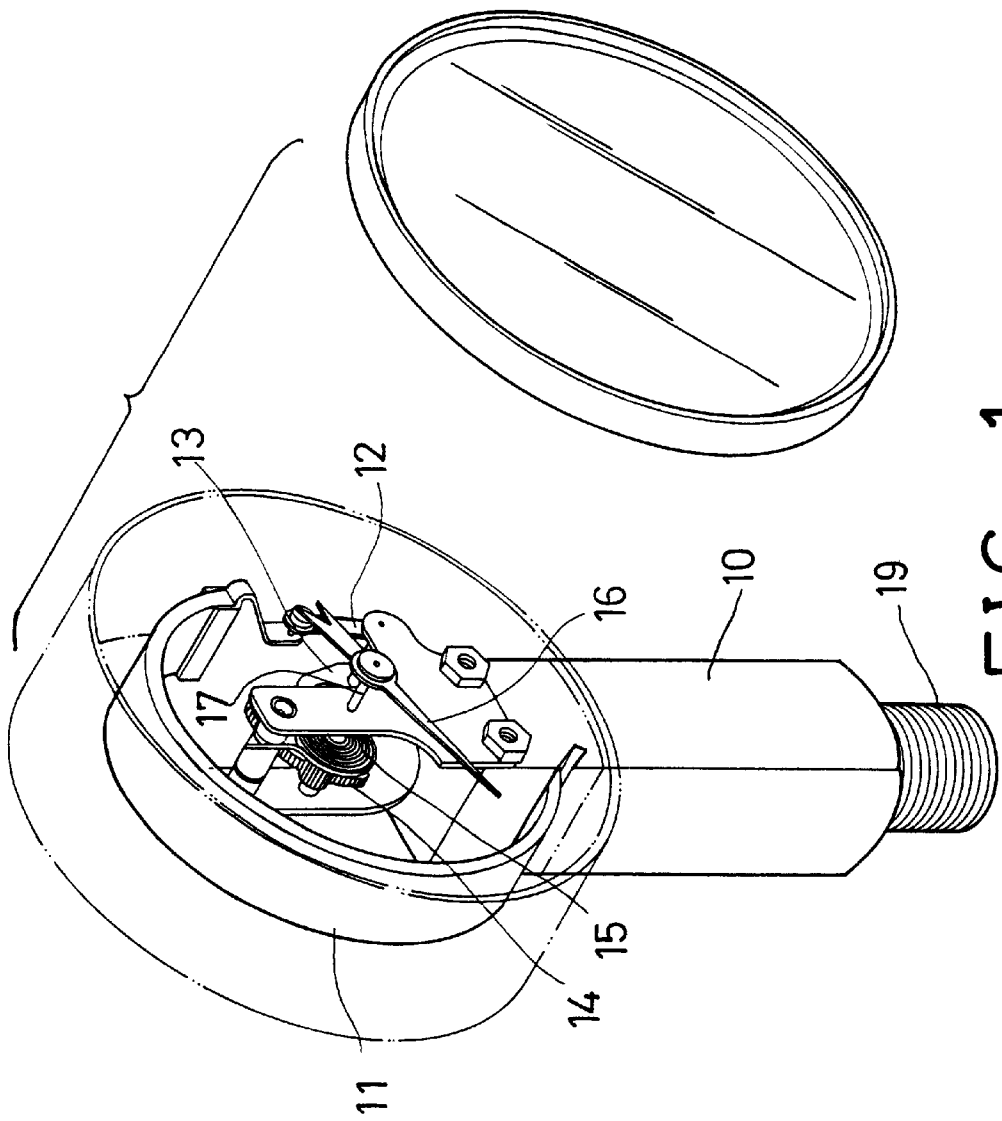
FIG. 1 is a partial exploded view showing a typical mechanical pressure gauge.
Figure 2:
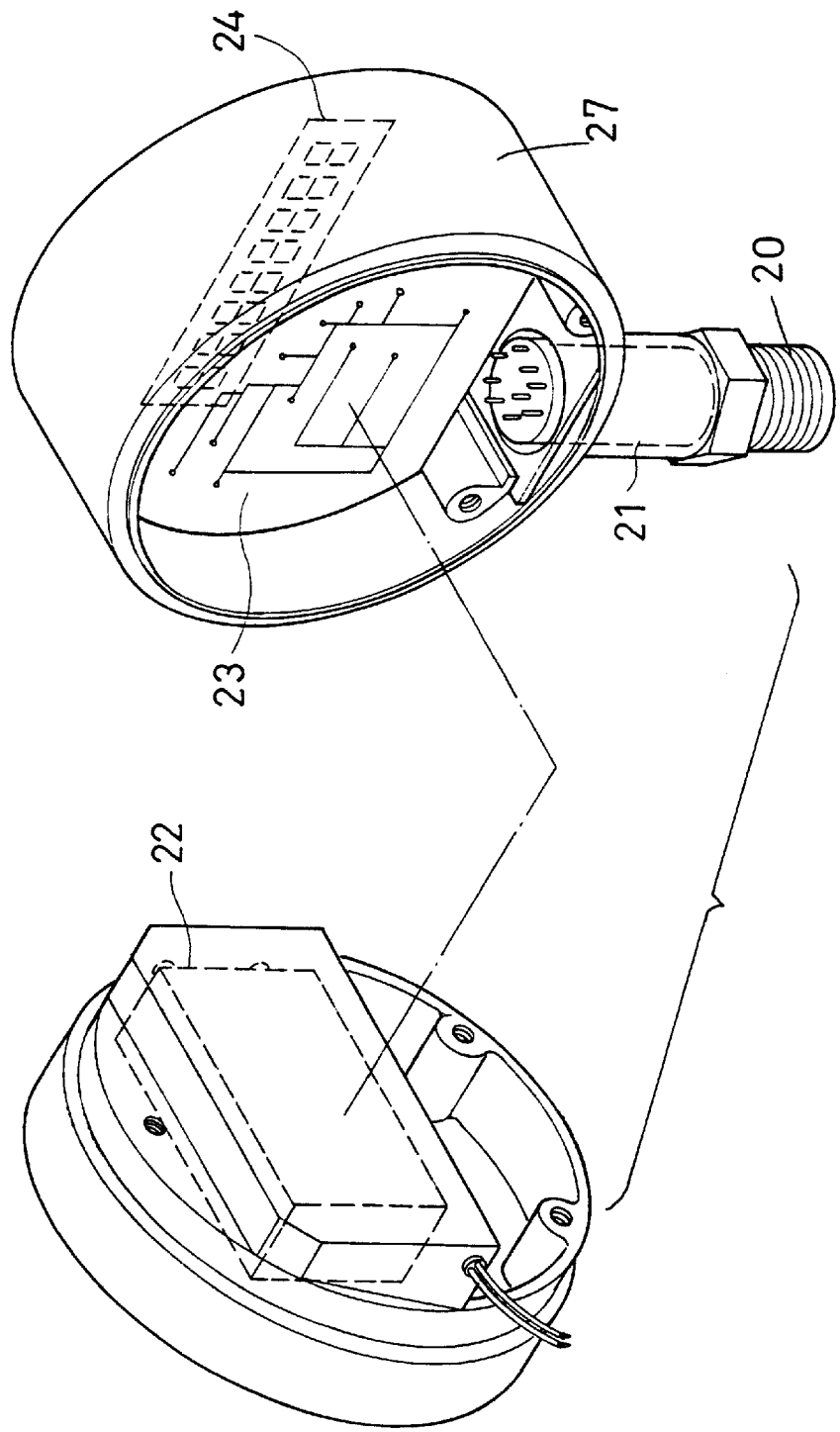
FIG. 2 is a partial exploded view showing a typical electrical pressure gauge.
Figure 3:
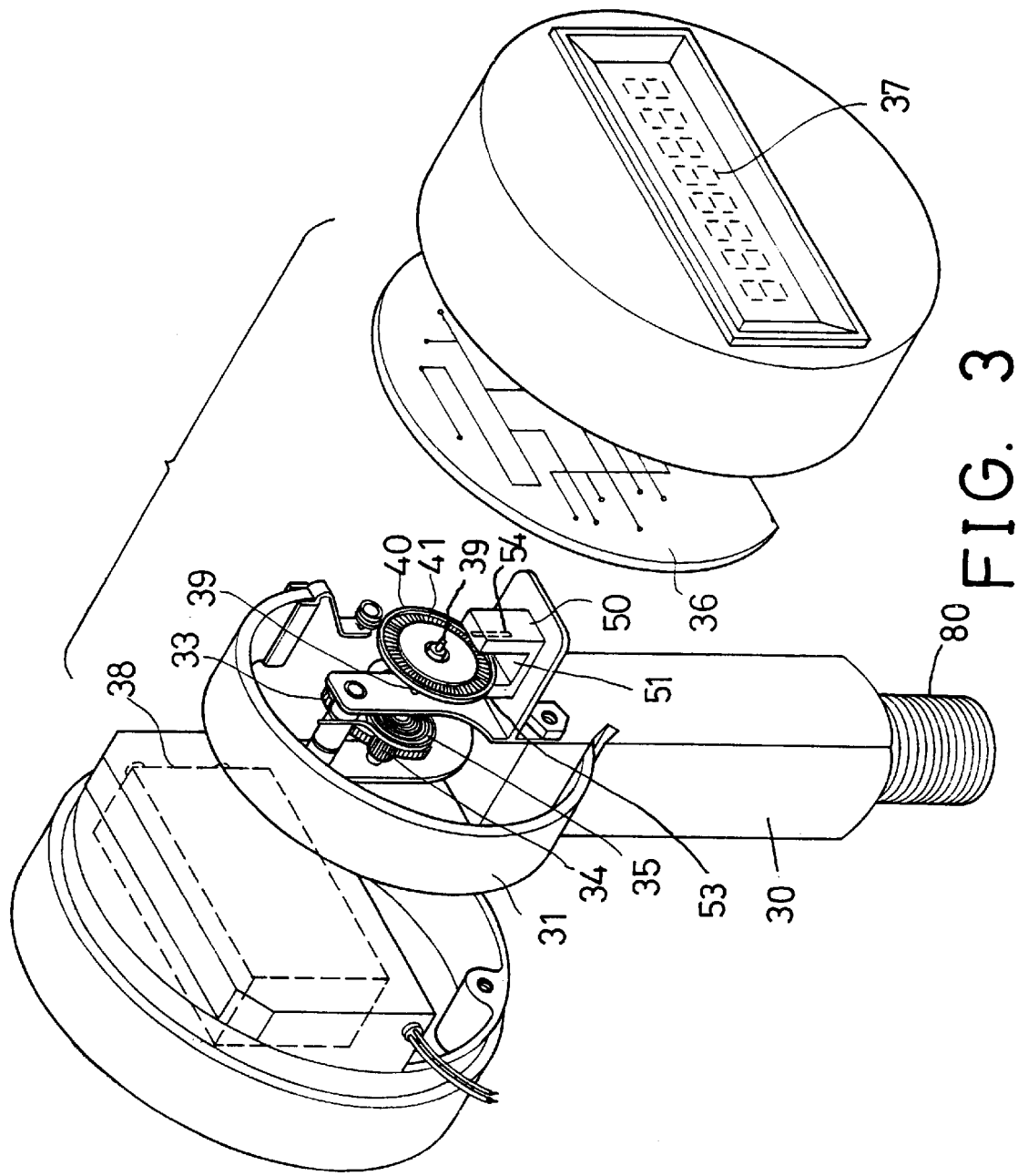
FIG. 3 is a partial exploded view showing a mechanical pressure gauge in accordance with the present invention.
Figure 4:
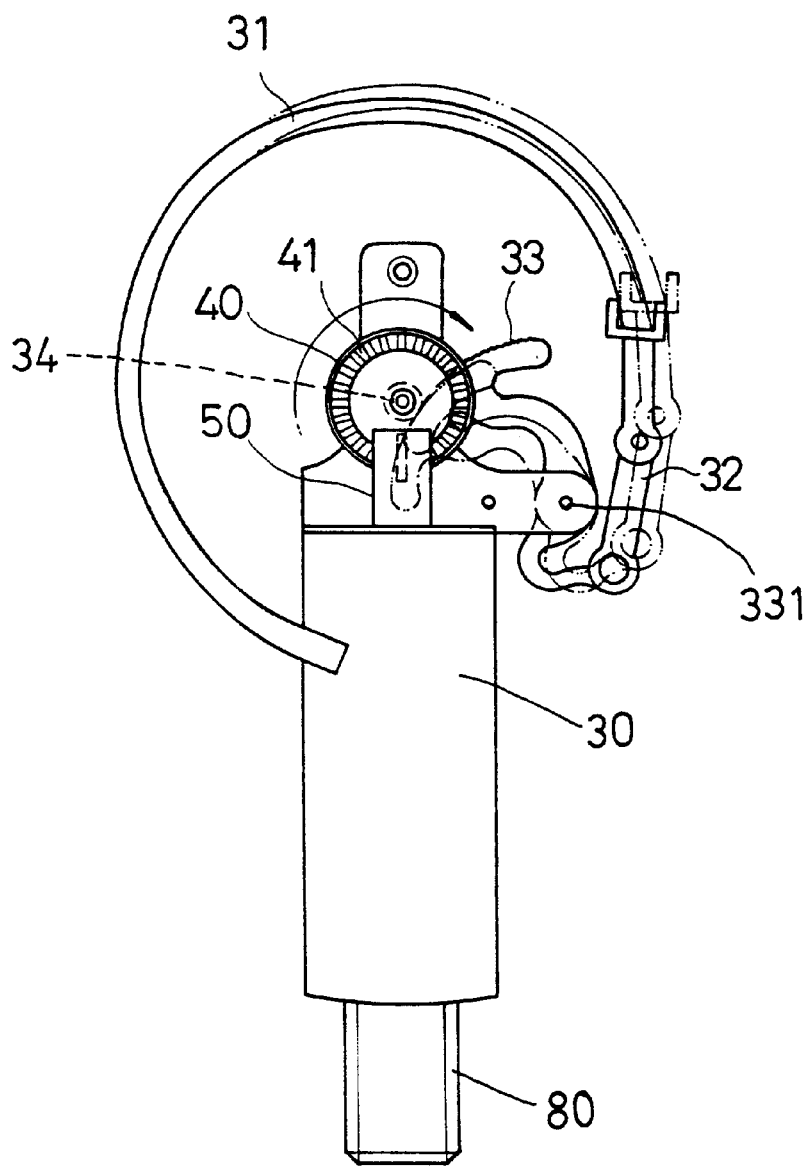
FIG. 4 is a partial plane view illustrating the configuration of the mechanical pressure gauge in accordance with the present invention.

Referring to FIGS. 3 and 4, a mechanical pressure gauge in accordance with the present invention comprises a Bourdon tube 31 coupled to a pressurized fluid reservoir with a port 80 of a support or a housing 30, a pinion 34 rotatably supported on the housing 30 with a spindle 39, and a sector gear 33 rotatably secured on the housing 30 with a pivot axle 331 and coupled to the Bourdon tube 31 with a link 32 and engaged with the pinion 34. The sector gear 33 may rotate the pinion 34 when the sector gear 33 is rotated by the Bourdon tube 31 via the link 32 and when the Bourdon tube 31 is deformed by the pressurized fluid that flows into the Bourdon tube 31. A spring 35 is engaged on the spindle 39 and engaged with the housing 30 for recovering the spindle 39 after the pressure is released from the housing 30. The above-described configuration is similar to that of the typical mechanical pressure gauge and will not be described in further details.

The mechanical pressure gauge in accordance with the present invention further comprises an electric circuit 36 for converting a mechanical signal or the like into a digital output, a displayer 37 coupled to the electric circuit 36 for displaying the digital output of the electric circuit 36, and one or more batteries 38 coupled to the electric circuit 36 for energizing the electric elements. The above-described configuration is similar to that of the typical electrical pressure gauge and will not be described in further details.

The mechanical pressure gauge in accordance with the present invention further comprises a plate or a disc 40 secured to the spindle 39 and rotated in concert with the pinion 34. The disc 40 includes a peripheral portion 401 having a number of openings 41 formed therein, for example, seventy five (75) openings 41 may be formed in the peripheral portion 401 of the disc 40. An optical sensor or a photo detector device 50 is further provided and disposed on the housing 30, and includes a gap 51 formed therein for receiving the peripheral portion 401 of the disc 40, and includes a light emitting device 53 disposed on one side of the disc 40 for emitting a light, and includes a detector 54 disposed on the other side of the disc 40 for detecting the light emitted from the light emitting device 53 and emitted through the openings 41 of the disc 40. The photo detector device 50, particularly the detector 54 of the photo detector device 50 is coupled to the electric circuit 36 for transmitted the detected light signal to the electric circuit 36 and for allowing the detected light signal to be displayed in the displayer 37 as a digital output.

The disc 40 and the photo detector device 50 may thus be used to receive or to detect the mechanical movement of the Bourdon tube 31 and/or the rotational movement of the spindle 39, and may send the detected mechanism movement to the electrical circuit 36 which may convert and display the signal as a digital output in the displayer 37. The pressure from the Bourdon tube 31 may thus be precisely shown as a digital output in the displayer 37.

Accordingly, the mechanical pressure gauge in accordance with the present invention includes a mechanical configuration and including a digital output for precisely showing and displaying the value of the pressure.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:
1. A pressure gauge comprising:
a) a housing,
b) a Bourdon tube coupled to a pressure reservoir for receiving a pressurized fluid,
c) a spindle supported on said housing,
d) means for recovering said spindle.
e) a pinion secured on said spindle and rotated in concert with said spindle,
f) a sector gear rotatably secured in said housing and engaged with said pinion,
g) a disc secured to said spindle and rotated in concert with said spindle, said disc including a peripheral portion having a plurality of openings formed therein,
h) a link coupled between said Bourdon tube and said sector gear for rotating said pinion via said sector gear, and for rotating said spindle and said disc in correspondence with a pressure in said Bourdon tube,
i) a light emitting device disposed on a first side of said disc for generating and emitting a light through said openings of said disc,
j) a detector disposed on a second side of said disc for detecting the light generated by said light emitting device and transmitted through said openings of said disc, and for detecting a rotational movement of said disc in correspondence with the pressure in said Bourdon tube,
k) an electric circuit coupled to said detector for receiving a detected signal from said detector in correspondence with a pressure in said Bourdon tube,
l) means for energizing said electric circuit, and
m) a displayer for displaying the pressure in said Bourdon tube.

* * * * *